US007366369B2

(12) United States Patent
Grass

(10) Patent No.: US 7,366,369 B2
(45) Date of Patent: Apr. 29, 2008

(54) TRANSMISSION OF MEASURED VALUES IN HIGH-VOLTAGE SUPPLY UNITS FOR ELECTROFILTERS

(75) Inventor: Norbert Grass, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 301 days.

(21) Appl. No.: 10/511,428

(22) PCT Filed: Apr. 4, 2003

(86) PCT No.: PCT/DE03/01119

§ 371 (c)(1), (2), (4) Date: Jun. 28, 2005

(87) PCT Pub. No.: WO03/086638

PCT Pub. Date: Oct. 23, 2003

(65) Prior Publication Data

US 2006/0153519 A1     Jul. 13, 2006

(30) Foreign Application Priority Data

Apr. 17, 2002 (DE) ............... 102 17 059

(51) Int. Cl.
*G02B 6/28* (2006.01)
*G02B 6/00* (2006.01)
*G02B 6/42* (2006.01)

(52) U.S. Cl. ............... 385/24; 385/14; 385/48
(58) Field of Classification Search ......... 385/14, 385/48, 24

See application file for complete search history.

(56) References Cited

U.S. PATENT DOCUMENTS 5,384,678 A    1/1995   Ebersohl et al.

(Continued)

FOREIGN PATENT DOCUMENTS

DE    37 11 244     10/1988

(Continued)

*Primary Examiner*—K. Cyrus Kianni
(74) *Attorney, Agent, or Firm*—Harness, Dickey & Pierce

(57) ABSTRACT

Disclosed is a high-voltage supply unit for electofilters. The unit includes high-voltage devices which are arranged close to the electrofilter and by which the electrofilter is supplied with high voltage, measuring heads which are assigned to the high-voltage devices and by which measured values and optional diagnostic data from the high-voltage devices are detected and transmitted, and control units, each of which is assigned to one high-voltage device and by which the high-voltage devices assigned thereto are controlled and regulated according to the requirements and by taking into account measured values and optional diagnostic data that are transmitted by the measuring heads. In order to improve the quality of signals during transmission between the measuring heads that are located at the high-voltage device and the control units, especially when the distances between the high-voltage devices that are placed near the electrofilter and the control units which are disposed in a control room or similar are relatively great, while keeping the technical complexity and expenses relatively low, each of the measuring heads which are placed at the high-voltage device end is provided with an LWL interface, the measuring heads are connected to a first local LWL network via the LWL interfaces thereof, the control units are interconnected by means of a second local LWL network, and the local LWL network which is located at the high-voltage device end and the local LWL network which is located at the control unit end are coupled to each other by way of an LWL connection.

18 Claims, 1 Drawing Sheet

U.S. PATENT DOCUMENTS

| | | | |
|---|---|---|---|
| 5,990,687 A * | 11/1999 | Williams | 324/529 |
| 6,034,798 A | 3/2000 | Oeberg | |
| 6,282,106 B2 * | 8/2001 | Grass | 363/37 |
| 2001/0006469 A1 * | 7/2001 | Grass | 363/37 |
| 2002/0030869 A1 * | 3/2002 | Okazaki et al. | 359/128 |

FOREIGN PATENT DOCUMENTS

| | | | |
|---|---|---|---|
| DE | 3711244 A1 | * | 10/1988 |
| EP | 0 569 838 | | 11/1993 |
| EP | 569838 A1 | * | 11/1993 |

\* cited by examiner

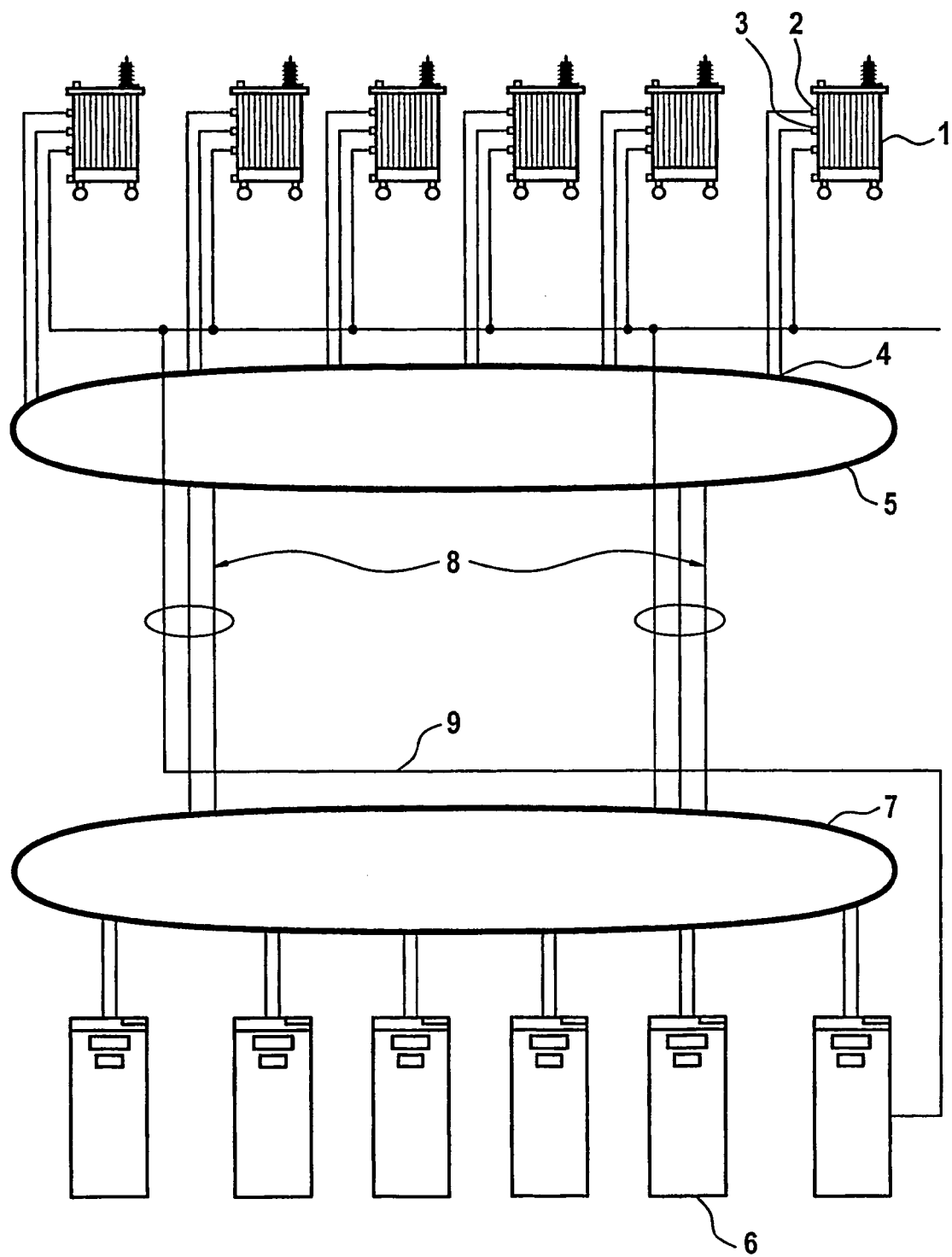

TRANSMISSION OF MEASURED VALUES IN HIGH-VOLTAGE SUPPLY UNITS FOR ELECTROFILTERS

This application is the national phase under 35 U.S.C. § 371 of PCT International Application No. PCT/DE03/01119 which has an International filing date of Apr. 4, 2003, which designated the United States of America and which claims priority on German Patent Application number DE 102 17 059.2 filed Apr. 17, 2002, the entire contents of which are hereby incorporated herein by reference.

FIELD OF THE INVENTION

The invention generally relates to a high-voltage supply device for electric filters having high-voltage devices. Preferably, it relates to one arranged close to the electric filter, and to one by which the electric filter can be supplied with an electrical high voltage. The device may further include measuring heads, which are associated with the high-voltage devices, and by which measured values and, if necessary, diagnosis data from the high-voltage devices can be detected and transmitted. The device may even further include control units, which are each associated with a high-voltage device, and by which the high-voltage devices associated with them can be controlled and regulated depending on requirements and taking into consideration measured values and, if necessary, diagnosis data transmitted by the measuring heads.

BACKGROUND OF THE INVENTION

The transmission of measured values and, if necessary, diagnosis data by the high-voltage devices or from the high-voltage part of an electric filter is necessary for controlling the power electronics of the high-voltage devices used for producing the high voltage. The measured values are required, inter alia, in order to detect any flashovers occurring. For this purpose, signal sampling of usually 10 ksamples/s per measured value is required.

At each high-voltage device, at least two measured values are detected, namely a measured value for the voltage and a measured value for the current. It is also possible to detect diagnosis data. It is possible to detect further measured values at the high-voltage device, for example for the temperature, the transformer primary voltage of the high-voltage device and the like.

The high-voltage devices or their high-voltage transformers are usually arranged on the roof of a housing in which the electric filter is accommodated. In contrast, the control units, including the power electronics, are accommodated in a control room which, in the case of large electric filters, is at a spacing of approximately 100 m to 700 m from the electric filter and thus from the high-voltage devices.

During operation of the high-voltage devices, voltages are used which are of the order of magnitude of 100 kV, with the result that electrical signal lines for signal transmission are not very suitable for transmitting signals between the measuring heads associated with the high-voltage devices and the control units.

In the case of a high-voltage supply device known from the prior art for electric filters, the measured values are transmitted from the measuring heads associated with the high-voltage devices to the control units using a suitable transmission protocol via optical waveguides. This transmission method gives the required signal qualities. In the case of this high-voltage supply device for electric filters, each of the measuring heads of a high-voltage device is connected via an optical waveguide path to the control unit associated with the relevant high-voltage device.

In particular in the case of comparatively large spacings between the control room accommodating the control units and the power electronics, on the one hand, and the high-voltage devices arranged close to the electric filter, on the other hand, considerable financial outlay for the installation and laying of the optical waveguide cable results in the case of the known point-to-point connections between in each case one high-voltage device and the control unit associated with it. This aspect is particularly important when modifying existing high-voltage supply devices of this type, in which generally copper cables have already been laid, and often results in copper cables continuing to be used for signal transmission for financial reasons, although the signal quality which can be achieved with copper cables is considerably worse.

SUMMARY OF THE INVENTION

An embodiment of the invention is based on an object of developing a high-voltage supply device for electric filters, with a justifiable amount of financial outlay, it is possible to improve the signal quality when transmitting data between the measuring heads provided on the high-voltage devices and the control units arranged in the control room which is at a comparatively large spacing from the high-voltage devices.

An object may be achieved according to an embodiment of the invention by the measuring heads on the high-voltage device side, each having an optical waveguide interface, by the measuring heads on the high-voltage device side being connected via their optical waveguide interfaces in a first local optical waveguide network, by the control units being connected to one another by way of a second local optical waveguide network, and by the local optical waveguide network on the high-voltage device side and the local optical waveguide network on the control unit side being coupled to one another by way of an optical waveguide connection.

In the case of the high-voltage supply device according to an embodiment of the invention for electric filters, the data based on the measured values and the diagnosis data are received directly at the high-voltage devices by way of the microcontroller-based measuring heads. In the case of conventional electric filters, an average number of approximately 20 high-voltage devices is used as a basis, and these high-voltage devices are generally arranged at a small spacing from one another which may be a few meters. By way of the optical waveguide interface which is associated with each high-voltage device or its measuring heads, all of the measuring heads on the high-voltage device side are connected to one another in the first local optical waveguide network.

Since the control units are also connected to one another via the second local optical waveguide network, the two local optical waveguide networks may be coupled to one another by way of a single optical waveguide connection, the financial outlay for setting up the two optical waveguide networks, which have only small dimensions, and for setting up the optical waveguide connection connecting these two local optical waveguide networks being comparatively low.

Only one optical waveguide connection is required to overcome the large distance between the two local optical waveguide networks. Using the optical waveguide technology which is available today, it is easily possible to realize the transmission rate of at least 10 Mbaud which is required for a configuration of the electric filter having approximately 20 high-voltage devices, it being necessary to select a suitable bus access control method.

The local optical waveguide network on the high-voltage device side and/or the local optical waveguide network on the control unit side may advantageously have a ring topology or a star topology, in which case the local optical waveguide networks or the ring or star topologies forming them should expediently be of redundant design in order to prevent total data transmission failures. It may optionally be possible to realize such redundancy of the local optical waveguide networks.

Since, in the case of the high-voltage supply device according to n embodiment of the invention for electric filters, the extent of the two local optical waveguide networks provided is comparatively low, the optical waveguides of the local optical waveguide networks may comprise, in a cost-efficient manner, plastic optical waveguides which can be easily prefabricated.

In order to ensure high availability of the data transmission between the two local optical waveguide networks it is expedient if the optical waveguide connection between the two local optical waveguide networks is of redundant design. The optical waveguide connection between the two local optical waveguide networks overcomes the comparatively large distance which is produced from the spacing between the control room and the high-voltage devices provided on the electric filter.

Glass or Photonic Crystal Fiber (PCF) optical waveguides may expediently be used as the optical waveguides in this optical waveguide connection. Sheathed optical waveguide cables which may be designed, for example, as a CUPOF-LEX+ cable have proved to be a particularly advantageous design for the optical waveguide connection.

Standard protocols, for example CAN, PROFIBUS, TCPIP protocols or the like, may expediently be used as the transmission protocol between the measuring heads and the control units.

In the case of the high-voltage supply device according to an embodiment of the invention for electric filters, a network technology is used which can be used with high reliability for transmitting measured values and diagnosis data between high-voltage devices and control units under real-time conditions.

BRIEF DESCRIPTION OF THE DRAWINGS

Further advantages, features and details of the invention will become evident from the description of illustrated exemplary embodiments given hereinbelow and the accompanying drawings, which are given by way of illustration only and thus are not limitative of the present invention, wherein:

the FIGURE illustrates the parts of a high-voltage supply device for electric filters which are used in an embodiment of the present invention.

DETAILED DESCRIPTION OF THE EXEMPLARY EMBODIMENTS

Associated with a high-voltage supply device according to an embodiment of the invention for electric filters, as is illustrated schematically in the figure, are high-voltage devices 1, by which the high voltage required for operating the electric filter can be generated.

An electric filter which is generally used, for example, in a power station, has, for example, 20 high-voltage devices 1. Its high-voltage transformers are often arranged on the roof of a housing accommodating the electric filter.

The transmission of measured values from the high-voltage devices 1 supplying power to the high-voltage part of the electric filter is thus necessary, inter alia, for detecting electrical flashovers. Depending on the measured values to be detected, signal sampling of typically 10 ksamples/s is thus required.

In the case of the high-voltage devices 1, at least two measured values are detected, namely a voltage value and a current value. Diagnosis data are also supplied by the high-voltage device 1.

It is possible for further measured values to be detected, for example the temperature or the transformer primary voltage.

In the embodiment (shown in the single figure) of the high-voltage supply device according to the invention for electric filters, two measuring heads 2, 3 are provided per high-voltage device 1 and are arranged directly on the respective high-voltage device 1.

Each measuring head 2, 3 of each high-voltage device 1 has an optical waveguide interface 4, all of the measuring heads 2, 3 of the high-voltage devices 1 being connected to one another by means of their optical waveguide interfaces 4 in a first local optical waveguide network 5.

The first local optical waveguide network 5 on the high-voltage device side has comparatively small dimensions, since the high-voltage devices 1 associated with the high-voltage part of the electric filter are generally arranged at a small spacing from one another.

The first local optical waveguide network 5 preferably has a ring or star topology. The physical extent of the first local optical waveguide network 5 on the high-voltage device side is comparatively small, with the result that inexpensive plastic optical waveguides which can be prefabricated in a simple manner can be used as the optical waveguides.

The ring topology or the star topology of the first local optical waveguide network 5 is of redundant design. As such, in the event of disruptions, communication failures or the like, only the high-voltage device 1 affected thereby can no longer be operated, whereas the high-voltage devices 1 which are not immediately affected can continue to be operated.

Associated with each high-voltage device 1 is a control unit 6, the control units 6 with their power electronics generally being accommodated in a control room. This control room may, in the case of comparatively large electric filters, be at a spacing of between 100 and 700 m from the high-voltage devices 1.

The control units 6 are likewise connected to one another via a second local optical waveguide network 7. This second local optical waveguide network 7 also has comparatively small dimensions, which makes it possible for inexpensive plastic optical waveguides which can be prefabricated in a simple manner to be used in its design.

The first local optical waveguide network 5 on the high-voltage device side and the second local optical waveguide network 7 on the control unit side are coupled to one another via an optical waveguide connection 8. In order to ensure high availability of the optical waveguide connection between the two local optical waveguide networks 5, 7, the optical waveguide connection 8 is provided twice, so as to realize redundant data transmission. By way of the optical waveguide connection 8 which is provided twice, the comparatively large distances which separate the building accommodating the electric filter and the control room accommodating the control units 6 from one another are bridged.

In the case of the optical waveguide connection 8, glass or PCF optical waveguides are used as the optical waveguides. Optical waveguide cables, for example CUPOFLEX+ cables, have proved advantageous for this purpose.

Standard protocols, for example CAN, PROFIBUS, TCPIP protocols or the like can be used as transmission protocols for the data transmission.

Using the optical waveguide technology conventional today, it is easily possible to realize a transmission rate of at least 10 Mbaud which is required for a configuration of the electric filter having 20 high-voltage devices 1. The exact transmission rate is, of course, dependent on the nature of the access to the local optical waveguide networks 5, 7.

The high-voltage devices 1 are supplied with power via an electrical power supply line 9 to which the individual high-voltage devices 1 are connected.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A high-voltage supply device for an electric filter, comprising:
   high-voltage devices, arranged close to the electric filter, adapted to supply the electric filter with an electrical high voltage;
   measuring heads, associated with the high-voltage devices, adapted to detect and transmit at least one of measured values and diagnosis data from the high-voltage devices; and
   control units, each respectively associated with a high-voltage device, each adapted to control and regulate the associated high-voltage device depending on requirements and taking into consideration the at least one of measured values and diagnosis data detected by the measuring heads, wherein the measuring heads, on the high-voltage device side, each include an optical waveguide interface, wherein the measuring heads, on the high-voltage device side, are connected via their optical waveguide interfaces in a first local optical waveguide network, wherein the control units are connected to one another by a second local optical waveguide network, and wherein the local optical waveguide network, on the high-voltage device side, and the local optical waveguide network, on the control unit side, are coupled to one another by an optical waveguide connection.

2. The high-voltage supply device for electric filters as claimed in claim 1, wherein at least one of the local optical waveguide network on the high-voltage device side, and the local optical waveguide network on the control unit side, includes a ring topology.

3. The high-voltage supply device for electric filters as claimed in claim 2, wherein the ring topology, forming the local optical waveguide networks, is of redundant design.

4. The high-voltage supply device for electric filters as claimed in claim 2, wherein the optical waveguide connection between the two local optical waveguide networks is of redundant design.

5. The high-voltage supply device for electric filters as claimed in claim 2, wherein the optical waveguides of the optical waveguide connection are in the form of at least one of glass and PCF optical waveguides.

6. The high-voltage supply device for electric filters as claimed in claim 1, wherein at least one of the local optical waveguide network on the high-voltage device side, and the local optical waveguide network on the control unit side, includes a star topology.

7. The high-voltage supply device for electric filters as claimed in claim 6, wherein the star topology, forming the local optical waveguide networks, is of redundant design.

8. The high-voltage supply device for electric filters as claimed in claim 6, wherein the optical waveguide connection between the two local optical waveguide networks is of redundant design.

9. The high-voltage supply device for electric filters as claimed in claim 6, wherein the optical waveguides of the optical waveguide connection are in the form of at least one of glass and PCF optical waveguides.

10. The high-voltage supply device for electric filters as claimed in claim 1, wherein at least one of a ring and star topology, forming the local optical waveguide networks, is of redundant design.

11. The high-voltage supply device for electric filters as claimed in claim 1, wherein the optical waveguides of the local optical waveguide networks are plastic optical waveguides.

12. The high-voltage supply device for electric filters as claimed in claim 1, wherein the optical waveguide connection between the two local optical waveguide networks is of redundant design.

13. The high-voltage supply device for electric filters as claimed in claim 1, wherein the optical waveguides of the optical waveguide connection are in the form of at least one of glass and PCF optical waveguides.

14. The high-voltage supply device for electric filters as claimed in claim 1, wherein the optical waveguide connection is in the form of a sheathed optical waveguide cable.

15. The high-voltage supply device for electric filters as claimed in claim 1, wherein a standard protocol is used as the transmission protocol between the measuring heads and the control units.

16. The high-voltage supply device for electric filters as claimed in claim 15, wherein standard protocols include at least one of CAN, PROFIBUS, and TCPIP protocols.

17. The high-voltage supply device for electric filters as claimed in claim 1, wherein the optical waveguides of the local optical waveguide networks are prefabricated plastic optical waveguides.

18. The high-voltage supply device for electric filters as claimed in claim 1, wherein the optical waveguide connection is in the form of a CUPOFLEX+ cable.

* * * * *